US008949122B2

(12) United States Patent
Leite et al.

(10) Patent No.: US 8,949,122 B2
(45) Date of Patent: Feb. 3, 2015

(54) STORED PHRASE REUTILIZATION WHEN TESTING SPEECH RECOGNITION

(75) Inventors: Lea T. Leite, Boynton Beach, FL (US); Jonathan Palgon, Boynton Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1805 days.

(21) Appl. No.: 12/036,886

(22) Filed: Feb. 25, 2008

(65) Prior Publication Data
US 2009/0216533 A1  Aug. 27, 2009

(51) Int. Cl.
| G10L 15/00 | (2013.01) |
| G10L 13/00 | (2006.01) |
| G10L 13/08 | (2013.01) |
| G10L 21/00 | (2013.01) |
| G10L 25/00 | (2013.01) |
| G10L 15/22 | (2006.01) |
| G10L 15/06 | (2013.01) |
| G10L 15/193 | (2013.01) |

(52) U.S. Cl.
CPC ............... *G10L 15/22* (2013.01); *G10L 15/063* (2013.01); *G10L 15/193* (2013.01)
USPC ........ 704/231; 704/260; 704/270; 704/270.1; 704/275

(58) Field of Classification Search
USPC .............................................. 704/9, 270, 277
See application file for complete search history.

(56) References Cited

U.S. PATENT DOCUMENTS

| 5,197,005 | A | * | 3/1993 | Shwartz et al. ........................ 1/1 |
| 6,173,266 | B1 | * | 1/2001 | Marx et al. .................... 704/270 |
| 6,275,792 | B1 | * | 8/2001 | Lewis ................. 704/9 |
| 6,345,250 | B1 | * | 2/2002 | Martin .......................... 704/260 |
| 6,345,252 | B1 | * | 2/2002 | Beigi et al. ..................... 704/272 |
| 6,728,682 | B2 | * | 4/2004 | Fasciano ........................ 704/278 |
| 7,013,276 | B2 | * | 3/2006 | Bickley et al. ................. 704/255 |
| 7,346,507 | B1 | * | 3/2008 | Natarajan et al. ............. 704/244 |
| 7,440,895 | B1 | * | 10/2008 | Miller et al. ................... 704/244 |
| 7,912,727 | B2 | * | 3/2011 | Gao et al. ....................... 704/277 |
| 8,046,227 | B2 | * | 10/2011 | Starkie ...................... 704/270.1 |
| 2002/0042707 | A1 | * | 4/2002 | Zhao et al. ........................ 704/9 |
| 2002/0077819 | A1 | * | 6/2002 | Girardo ......................... 704/260 |
| 2002/0156616 | A1 | * | 10/2002 | Russell ............................. 704/4 |
| 2003/0023439 | A1 | * | 1/2003 | Ciurpita et al. ............... 704/246 |
| 2003/0078779 | A1 | * | 4/2003 | Desai et al. .................... 704/257 |
| 2004/0199375 | A1 | * | 10/2004 | Ehsani et al. ...................... 704/4 |
| 2004/0254792 | A1 | * | 12/2004 | Busayapongchai et al. .. 704/260 |

(Continued)

OTHER PUBLICATIONS

"Nuance Speech Recognition System, Version 7.0, Nuance Grammar Developers Guide", copyright 1996-2001, Nuance Communications, Inc., Menlo Park, California, p. 1-114.*

Lewis, "Testing Natural Language Application Recognition Accuracy and Habitability", Mar. 20, 2000, Speech Development and Customization, p. 1-18.*

(Continued)

*Primary Examiner* — Olujimi Adesanya
(74) *Attorney, Agent, or Firm* — Wolf, Greenfield & Sacks, P.C.

(57) ABSTRACT

A set of audio phrases and corresponding phrase characteristics can be maintained, such as in a database. The phrase characteristics can include a translation of speech in the associated audio phrase. A finite state grammar that includes a set of textual phrases can be received. A software algorithm can execute to compare the set of textual phrases against the translations associated with the maintained audio phrases. A result of the software algorithm execution can be produced, where the result indicates phrase coverage for the finite state grammar based upon the audio phrases.

29 Claims, 2 Drawing Sheets

(56) References Cited

U.S. PATENT DOCUMENTS

| | | | |
|---|---|---|---|
| 2005/0108013 A1* | 5/2005 | Karns | 704/254 |
| 2005/0125232 A1* | 6/2005 | Gadd | 704/270.1 |
| 2006/0025996 A1* | 2/2006 | Ju et al. | 704/255 |
| 2006/0093097 A1* | 5/2006 | Chang | 379/88.01 |
| 2006/0190252 A1* | 8/2006 | Starkie | 704/240 |
| 2007/0032222 A1* | 2/2007 | Koch | 455/412.2 |
| 2007/0043568 A1* | 2/2007 | Dhanakshirur et al. | 704/258 |
| 2007/0140466 A1* | 6/2007 | Sharma | 379/235 |

OTHER PUBLICATIONS

Rohlicek et al,"Statistical language modeling using a small corpus from an application domain," 1988, International Conference on Acoustics, Speechand Signal processing, pp. 267-270 vol. 1, Apr. 11-14, 1988.*

"Nuance Speech Recognition System, Version 8.5, Grammar Developer's Guide", copyright 2003, updated Dec. 2003, Nuance Communications, Inc., Menlo Park, California, p. i-248.*

* cited by examiner

STORED PHRASE REUTILIZATION WHEN TESTING SPEECH RECOGNITION

BACKGROUND OF THE INVENTION

The present invention relates to the field of speech processing technologies and, more particularly, to stored phrase reutilization when testing speech recognition grammars.

Voice user interfaces (VUI) and multimodal interfaces accept spoken phrases as input. These spoken phrases are speech recognized using an associated speech recognition grammar. In many implementations, different application states of the VUI are associated with different permissible spoken phrases. These phrases are recognized by a context dependent speech recognition grammar, where the context is based upon the VUI state. As changes are made to a VUI interface, the set of permitted spoken phrases and corresponding context dependent speech recognition grammars can change. Thus, from version to version of a VUI, related speech recognition grammars can change.

Testing VUIs can be a challenge, especially with regards to testing speech recognition accuracy and precision, which can involve an accuracy and precision of underlying speech recognition grammars. Typically, each speech recognition grammar is tested using a large number of pre-recorded phrases. The pre-recorded phrases are typically stored in a database as an audio file, which is associated with a text representation of each stored phrase. When a speech recognition engine using the speech recognition grammar is able to generate a text result from the audio file, which matches the stored text representation, a successful test has occurred. Ideally, the set of test phrases used to test a speech recognition grammar should cover a statistically significant portion, if not all, of the allowed phrases.

Current VUI testing techniques focus upon maximizing phrase coverage and minimizing complexities of testing. Many VUI testing techniques select a set of phrases for a given version of a VUI and store a version specific test set of phrases consisting of audio files and textual representations for each of the selected phrases. When a common phrase is used across more than one VUI version, multiple copies of audio files for that common phrase are stored, one copy per each version specific test set. Additionally, each test set for a VUI version can be produced through a VUI version specific recording session. These practices result in significant storage and recording costs.

Often a minimization of recording costs is attempted by relying upon one or more external sources of audio recordings. A large manual effort is involved in selecting which phrases from the external sources are to be used to test each specific speech recognition grammar. The cost, time, and confusion resulting from manual efforts of selecting phrases for grammar testing is one reason many opt for the previous solution of version specific recordings, which result in version specific test sets.

BRIEF SUMMARY OF THE INVENTION

One aspect of the present invention can include a method, apparatus, computer program product, and system for maximizing a use of stored phrases for speech recognition purposes. In the aspect, a set of audio phrases and corresponding phrase characteristics can be maintained, such as in a database. The phrase characteristics can include a translation of speech in the associated audio phrase. A finite state grammar that includes a set of textual phrases can be received. A software algorithm can execute to compare the set of textual phrases against the translations associated with the maintained audio phrases. A result of the software algorithm execution can be produced, where the result indicates phrase coverage for the finite state grammar based upon the audio phrases.

Another aspect of the present invention can include a system for maximizing a set of stored phrases. The system can include a data store and a coverage software tool. The data store can include digitally encoded information specifying a set of audio phrases and associated phrase characteristics. The phrase characteristics can include a translation of speech in the associated audio phrase. The coverage tool can receive as input an identifier for a finite state grammar. The finite state grammar can include a set of textual phrases associated with a voice user interface (VUI). The coverage software tool can compare the textual phrases against the translations associated with the audio phrases and can produce a result. The result can indicate phrase coverage for the finite state grammar based upon the audio phrases.

DETAILED DESCRIPTION OF THE INVENTION

The present inventions stores speech phrases in a data store, each of which are associated with a text translation of the related phrase. A software tool can analyze the stored speech phrases in context of a particular finite state grammar. This finite state grammar represents a vocabulary of a speech recognition grammar associated with a version and/or application state of a voice user interface. That is, the finite state grammar defines a set of valid phrases for a speech enabled application. A test phrase coverage tool can analyze the set of speech phrases in the data store and determine which are valid for the finite state grammar. The determined valid phrases from the data store can be used as a test set to test the finite state grammar.

In one embodiment, when coverage of pre-existing phrases in the data store is insufficient to test a finite state grammar, new phrases can be added to the data store as needed. Each time a finite state grammar changes and/or the phrases in the data store changes, the coverage tool can be re-run to determine an updated coverage report. Configurable settings can exist for the coverage tool, which permits software developers to be automatically notified whenever coverage falls below established limits.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
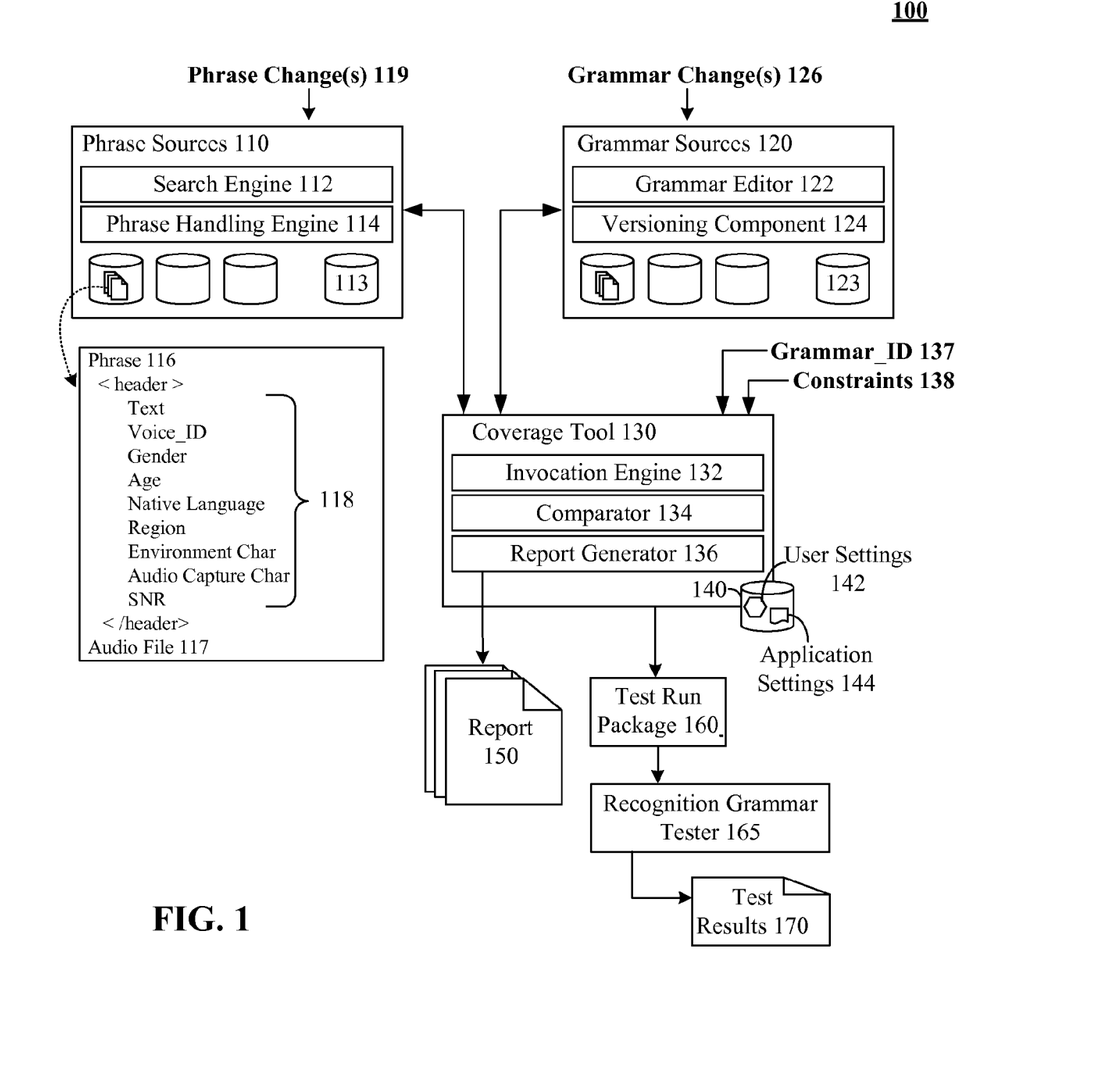
FIG. 1 is a schematic diagram of a system for maximizing phrase coverage by comparing a set of previously stored phrases against one or more finite state grammars in accordance with an embodiment of the inventive arrangements disclosed herein.

FIG. 1 is a schematic diagram of a system 100 for maximizing phrase coverage by comparing a set of previously stored phrases against one or more finite state grammars in accordance with an embodiment of the inventive arrangements disclosed herein. In system 100, a coverage tool 130 can receive a grammar identifier 137 as well as one or more optional constraints 138 as input. The coverage tool 130 can then compare a set of in-grammar phrases from grammar sources 120 against a set of previously stored phrases of the phrase sources 110 to generate a report 150 and/or a test run package 160. The report 150 and/or the package 160 each contain information showing which of the phrases of the phrase sources 110 are valid/invalid phrases for the selected grammar associated with grammar identifier 137. In one embodiment, the package 160 can be used as input for a recognition grammar tester 165, which produces test results 170. Each time a set of phrases of the phrase sources 110 changes 119 and/or the grammar changes 126, the coverage tool 130 can re-execute to generate a new report 150, to generate a package 160, and/or to take another programmatic action related to comparison results.

Although one contemplated use of system 100 is for testing and/or evaluating speech recognition grammar performance, other situations exist in which system 100 can be used. For example, the coverage tool 130 can be used as a filter to filter all phrases possible in a grammar. The phrases that fail the filter can be considered "out of vocabulary phrases" and those that pass the filter can be considered "in vocabulary" phrases. Constraints 138 can be imposed on the filter as desired. A filter embodiment can be useful in identifying potential expansion phrases for a grammar or even potential phrases to remove from a grammar.

The phrase sources 110 of system 100 can include one or more linked data stores, each containing a set of audio phrases. These data stores can be geographically distributed and interconnected via a network. In one embodiment, a database 113 can be used to manage the phrases and to expedite search operations. For example, the database 113 can be a relational database management system (RDBM) that includes indexed records for each audio segment 117 and associated phrase characteristics 118. The database 113 is an optional component of the phrase sources 110, which is not necessary in some implementation, especially those that manage a relatively modest quantity of audio phrases.

Associations between an audio file 117 and its corresponding characteristics 118 can be maintained in numerous fashions. One fashion is to utilize records of a relational database. Another is to include the characteristics as metadata linked to the audio files 117. For example, a header of the audio file can specify the set of characteristics 118. At a minimum, these characteristics 118 can include a textual representation of the audio 117, which is a translation of the audio 117. Other characteristics 118 can be useful in constraining a coverage comparison and/or in providing more detailed report 150 information.

These characteristics 118 can include, but are not limited to, a gender, an age, a native language, a region, environment characteristics, audio capture voice identifier (e.g., identifies the voice talent providing a recording), a recording session identifier, audio capture characteristics, a signal to noise ratio (SNR) value, a voice identifier, a recording session identifier, and the like. The gender can refer to a gender of a speaker of the audio 117. The age is the age of a speaker. The native language is a native language of a speaker. The region refers to a region where a speaker grew up, which can also be defined as a dialect characteristic and/or an accent characteristic. The environmental characteristic can refer to ambient noise characteristics of the recording, such as noises representing an office background, a moving automobile, etc. The audio capture characteristics refer to a microphone type for capturing audio, a microphone brand, a distance from a speaker to a microphone, noise suppression characteristics, a fidelity of captured audio and the like. The SNR is a measure of ambient noise. The voice identifier can identify a specific voice talent who made a recording, which can be useful when supplemental recording sessions are necessary. The recording session identifier can identify and provide details of a recording session from which the audio 117 was produced. Any desired characteristics 118 can be added to system 100.

In one embodiment, a search engine 112 can exist, which is designed to search all the phrase sources. This engine 112 can execute SQL queries in a configuration where a database 113 is used. In an implementation lacking a database 113, the engine 112 can search for key phrases and terms, such as those present within a header, which define characteristics 118. One of the searches of engine 112 can generate a "master listing" of text phrases included in the phrase sources 110. Moreover, engine 112 can permit the master listing (through use of filters and/or additional query parameters) to be limited by selected characteristic 118 values, which can be specified within constraints 138 for a given comparison instance.

A phrase handling engine 114 can perform all programmatic actions necessary to maintain a currency of the phrases from the phrase sources 110. For example, when multiple different data stores of phrases exist, the phrase handling engine 114 may have to normalize a format of the phrases and characteristics 118 contained in the different data stores. The phrase handling engine 114 can also periodically synchronize content from different data stores and can handle conflicting or redundant entries. Engine 114 can also extract metadata content 118 from audio files and use this content to maintain database 113 records. Further, the engine 114 can perform appropriate index, database 113, and other updates when phrases change 119 to ensure a currency of phrase information.

The grammar sources 120 can include one or more linked data stores of grammars. A database 123 can optionally be used to centrally manage information of these data stores. The grammars of the sources 120 can be finite state grammars (FSG), which define a vocabulary. This vocabulary can be associated with a specific context or speech enabled application. A versioning component 124 can maintain records indicating which FSG grammars are associated with which speech-enabled application version. Grammar editor 122 can permit an authorized user to add, delete, and edit FSGs of the data stores. Grammar changes 126 can also be received from external sources. In one embodiment, the grammar editor 122 and/or the versioning component 124 can be integrated components of a software development platform.

The coverage tool 130 can be communicatively linked to the phrase sources 110 and the grammar sources 120. Tool 130 can include an invocation engine 132, a comparator 134, and a report generator. Additionally, the tool 130 can be able to access a data store 140, which can include user settings 142, application settings 144, and the like, which can affect operations of the tool 130. The settings 142, 144 of data store 140 can be user or administrator configurable in one contemplated arrangement of system 100.

Invocation engine 132 can invoke an execution of the coverage tool 130, which can occur responsive to a manually issued user command and/or based upon an occurrence of a detectable event. A manual command can, for example, be issued from a testing application, a software development application, a grammar creation application, and/or any other application to which the coverage tool 130 is programmatically linked. Events monitored by the invocation engine 132 can include a change 119 in the phrases, a grammar change 126 to the vocabularies, and the like. The events and conditions for triggering invocation actions can be modified and configured by a user or authorized administrator. For example, a setting can be applied to the invocation engine 132, where an execution occurs only if the phrases changed 119 exceed a percentage threshold (e.g., five percent or more of the total phrases have changed), a time threshold (e.g., one percent or greater change and no coverage update in at least three days), or any other definable set of conditions.

Comparator 134 can compare the phrases of a given set of grammars (i.e., defined by Grammar_ID 137) against a set of phrases stored in the phrase sources 110. In one embodiment, constraints 138 can be applied, which limit the scope of comparison performed by the comparator 134. For example, the constraints 138 can limit matched phrases of the phrase sources 110 to those that are male (i.e., gender=male using characteristics 118). Constraints 138 can set any definable limitation on the comparison, which is not limited to values of the characteristics 118. For example, a constraint 138 can limit the phrase sources 110 being compared to those resulting from recordings specifically made for previous incarcerations (versions) of an application (assuming the grammar being compared is for a new version of an application). In various configurations, settings of the comparator 134 can cause the comparison to determine in-grammar phrases (e.g., contained in the previously stored phrase sources 110 and the grammar being compared), out-of-grammar phrases (contained in one or more of the data stores of the phrase sources 110 but missing from the grammar being compared), non-covered phrases (contained in the grammar being compared but absent from the phrase sources 110), and the like.

The report generator 136 can generate a set of reports 150 including customizable reports 150 relating to results of comparisons performed by the comparator 134. In one embodiment, SQL based reports can be configured. Additionally, in one implementation a report creation GUI can be included with the tool 130 to permit a user to establish custom reports. The report generator 136 can provide various statistics within the reports 150, which help identify holes in phrase coverage, an adequacy of phrase coverage, and to provide a level of confidence for phrases which are available. For example, the reports 150 can include how many utterances of a particular phrase were selected, how much unique phrase coverage there is for a particular grammar, and the like.

The various reports 150 can be intended for different audiences and purposes. For example, a report 150 to an application developer can specify an expected accuracy of a test based upon the phrase coverage. A report 150 for a sound technician can specify the audio capture characteristics, and environmental characteristics of the available phrases, can provide summary statistics like average environmental characteristics, range of available environmental characteristics for complete environmental coverage, etc. In one embodiment, the reports 150 can produce intermediary files, which are designed to be consumed by executing programs. For example, one report 150 can define unique phrases 110, their locations, etc, which can be consumed by a recognition grammar tester 165 during a test (i.e., the report can define a test run package 160, which the recognition grammar tester 165 can utilize). In another example, a report 150 can be an automatically generated script to be read by a voice talent to generate additional phrases for the phrase sources 110 (i.e., the script can include needed phrases for a grammar not originally contained in the phrase sources 110). One or more of the reports 150 can combine information from the comparator 134 with other information, such as a report of test results 170, which combines results from the tester 165 and the comparator 134.

Figure 2:
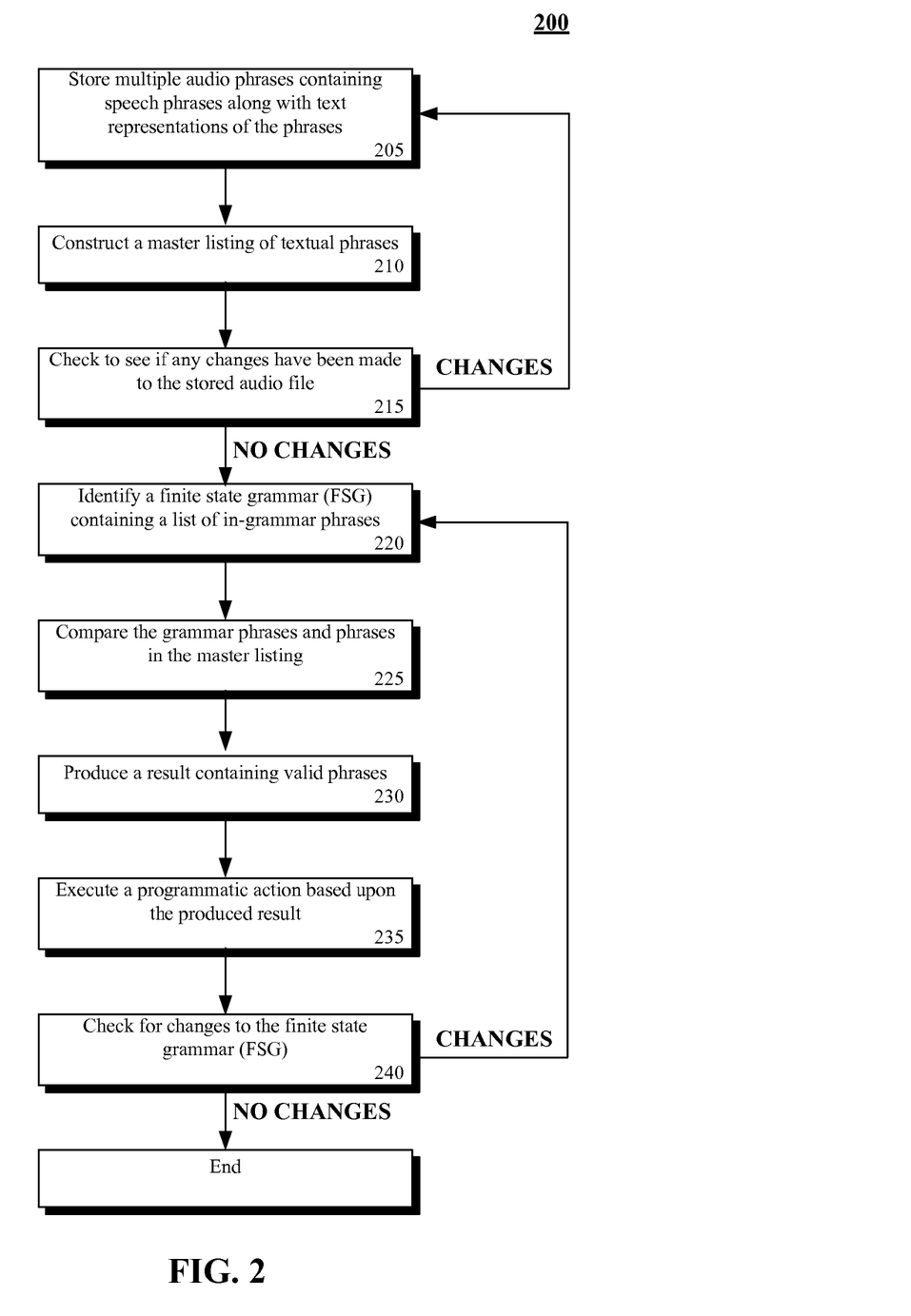
FIG. 2 is a flow chart of a method for maximizing a use of stored phrases to test speech recognition grammars in accordance with an embodiment of the inventive arrangements disclosed herein.

FIG. 2 is a flow chart of a method 200 for maximizing a use of stored phrases to test speech recognition grammars in accordance with an embodiment of the inventive arrangements disclosed herein. The method 200 can be performed in a context of system 100, or any other system designed to compare a set of recorded phrases against one or more speech enabled grammars.

Method 200 can begin in step 205, where multiple audio files containing speech phrases and associated textual translations are stored in at least one searchable data store, such as a database. Multiple data stores can be linked, each containing a unique set of speech phrases and translations. In one embodiment, additional phrase defining attributes other than just the textual translation of the phrase can be recorded. Characteristics can include, but are not limited to, a gender of the speaker, an age of the speaker, a native language of the speaker, a region of the speaker, environmental characteristics of the audio file, audio capture characteristics of the audio file, signal to noise ratio of the audio file, and the like. These additional characteristics will often apply to a set of audio files, such as audio files produced in a single recording session, which can be stored in entries of a database table linked to multiple ones of the audio files.

In step 210, a master listing of textual phrases associated with audio files can be obtained. In an RDBMS implementation, this master listing can be generated using a SQL query. In another implementation, the textual phrases can be stored in metadata fields (e.g., within a header, for example) of the audio files. Creation of the master listing of textual phrases can parse the textual phrases from each file. These two approaches can be combined, where the textual phrases are first extracted and placed in a database table in a manner indexed against the audio file from which the extraction occurred. In one embodiment, the master listing can be restricted to one or more of the audio characteristics, such as restricted to only include phrases spoken by males or phrases having a SNR under a fixed threshold. In step 215, a check can be made to see if any changes have been made to the stored audio files since a last time steps 205 and 210 executed. If so, the method can re-execute steps 205 and 210 to ensure the master listing of textual phrases is current.

In step 220, a finite state grammar can be identified, which contains a list of grammar phrases. In step 225, a comparison can be made between the grammar phrases and the phrases of the master listing. In step 230, a result list of valid phrases from the master listing satisfying corresponding grammar phrases can be produced. This produced list of valid phrases can be further utilized to drive a variety of other programmatic actions, as shown by step 235. For example, a test set of grammar phrases can be generated, which can be used to test the finite state grammar. In another example, a list of needed phrases (not covered by an existing phrase in the master listing) can be created, which can form a basis for a recording script. The recording script can be a script that a voice talent is to read during a recording session to generate supplemental audio phrases to be utilized to test the finite state grammar. These supplemental recordings can be added to the data store, which would trigger a corresponding change (step 215) to the master listing. In step 240, a check for changes to the finite state grammar can be made. When the grammar changes, the method can repeat steps 220-235 to obtain a current listing of valid phrases.

The method can repeat steps 220-240 for any number of different finite state grammars. In one embodiment, the steps of the method can be implemented by a computing device in accordance with a set of programmatic instructions. Further, these programmatic instructions can be integrated into a software development environment. For example, the toolset can include a finite state grammar creation and editing component, which is used to make changes to the finite state grammar of step 220. Each time a change to a finite state grammar is made, steps 220-235 can automatically execute. In another example, the programmatic instructions can be integrated with a testing tool, which automatically tests a finite state grammar based upon the audio files associated with phrases in the produced listing of valid phrases. Coverage limitations can be established, which causes notifications for additional phrases to be automatically generated and conveyed to responsible parties as part of the programmatic actions of step 235. Thus, the method 200 can be part of a dynamic software development process, which automatically determines a set of test phrases for recognition grammars and/or deficiencies in testing coverage as changes to underlying software development projects are made.

The diagrams in FIGS. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of evaluating a plurality of stored audio phrases and at least one finite state grammar, wherein the at least one finite state grammar defines at least a first plurality of text phrases and wherein the plurality of stored audio phrases correspond to a second plurality of text phrases, the method comprising:
    determining, for each one text phrase of the first plurality of text phrases and based at least in part on phrase characteristics associated with the plurality of stored audio phrases, whether there is an audio phrase of the plurality of stored audio phrases that corresponds to the one text phrase, wherein the determining is performed using at least one programmed processor; and
    identifying a phrase coverage for the at least one finite state grammar based at least in part on the determining, the phrase coverage indicating whether there are one or more text phrases of the first plurality of text phrases defined by the at least one finite state grammar to which none of the plurality of stored audio phrases corresponds.

2. The method of claim 1, further comprising:
    generating a test run package for the finite state grammar including at least one stored audio phrase, of the plurality of stored audio phrases, that was determined in the determining to correspond to at least one text phrase of the first plurality of text phrases; and
    testing a speech recognition performance of the at least one finite state grammar using the test run package.

3. The method of claim 1, wherein the receiving, determining, and identifying are carried out by a software development interface configured to create speech-enabled applications,
    wherein the at least one finite state grammar is a speech recognition grammar associated with a voice user interface (VUI) being developed using the software development interface, and
    wherein the method further comprises generating, with the software development interface, a test run package comprising at least one audio phrase of the plurality of stored audio phrases that is used to test the speech recognition grammar.

4. The method of claim 1, wherein:
    the at least one finite state grammar comprises a plurality of finite state grammars; and
    said method further comprises maximizing a use of the plurality of stored audio phrases by utilizing each audio phrase of the plurality that corresponds to one or more text phrases of the plurality of finite state grammars when testing speech recognition performance of each of the plurality of finite state grammars.

5. The method of claim 1, wherein the determining, based at least in part on phrase characteristics, comprises determining whether an audio phrase corresponds to each one text phrase based at least in part on at least two of a gender of a speaker, an age of a speaker, a native language of a speaker, a region of childhood residence of the speaker, at least one environmental characteristic of the audio phrase, at least one audio capture characteristic of the audio phrase, and a signal to noise ratio (SNR) present in the audio phrase.

6. The method of claim 5, further comprising:
    specifying at least one constraint for the determining, wherein said at least one constraint specifies a value for at least one of the phrase characteristics,
    wherein determining, for each one text phrase, whether there is an audio phrase that corresponds to the one text phrase, based at least in part on the phrase characteristics, comprises identifying, from the plurality of stored audio phrases, audio phrases having an associated phrase characteristic value matching the at least one constraint and reviewing the identified audio phrases to determine whether the audio phrases having the associated phrase characteristic correspond to the one text phrase.

7. The method of claim 1, wherein identifying the phrase coverage comprises generating a user configured report, wherein said report comprises summary statistics relating to the phrase coverage.

8. The method of claim 1, further comprising:
    performing the determining and identifying in response to detecting a programmatically triggered event, wherein the programmatically triggered event results from a detection of a change in the at least one finite state grammar or a change in the plurality of stored audio phrases.

9. The method of claim 1, wherein identifying the phrase coverage comprises identifying at least one first text phrase of the first plurality of text phrases to which none of the plurality of stored audio phrases corresponds.

10. The method of claim 1, wherein the determining for each one text phrase comprises querying, using the one text phrase, a data store of the phrase characteristics associated with the plurality of stored audio phrases.

11. The method of claim 6, wherein the determining for each one text phrase comprises querying, using the one text phrase and the at least one constraint, a data store of the phrase characteristics associated with the plurality of stored audio phrases.

12. At least one non-transitory computer-readable storage medium encoded with computer-executable code that, when executed by at least one processor, causes the at least one processor to carry out a method of evaluating a plurality of stored audio phrases and at least one finite state grammar, wherein the at least one finite state grammar defines at least a first plurality of text phrases and wherein the plurality of stored audio phrases correspond to a second plurality of text phrases, the method comprising:
    determining, for each one text phrase of the first plurality of text phrases and based at least in part on phrase characteristics associated with the plurality of stored audio phrases, whether there is an audio phrase of the plurality of stored audio phrases that corresponds to the one text phrase; and
    identifying a phrase coverage for the at least one finite state grammar based at least in part on the determining, the phrase coverage indicating whether there are one or more text phrases of the first plurality of text phrases defined by the at least one finite state grammar to which none of the plurality of stored audio phrases corresponds.

13. The at least one non-transitory computer-readable storage medium of claim 12, wherein the method further comprises:
    generating a test run package for the at least one finite state grammar including at least one stored audio phrase, of the plurality of stored audio phrases, that was determined in the determining to correspond to at least one text phrase of the first plurality of text phrases; and
    testing a speech recognition performance of the at least one finite state grammar using the test run package.

14. The at least one non-transitory computer-readable storage medium of claim 12, wherein the method further comprises:
    maximizing a use of the plurality of stored audio phrases by utilizing each audio phrase of the plurality that corresponds to one or more text phrases of at least one finite state grammar when testing speech recognition performance of each of the at least one finite state grammar.

15. The at least one non-transitory computer-readable storage medium of claim 12, wherein the determining, based at least in part on phrase characteristics of an audio phrase, comprises determining whether an audio phrase corresponds to each one text phrase based at least in part on at least two of a gender of a speaker, an age of a speaker, a native language of a speaker, a region of childhood residence of the speaker, at least one environmental characteristic of the audio phrase, at least one audio capture characteristic of the audio phrase, and a signal to noise ratio (SNR) present in the audio phrase.

16. The at least one non-transitory computer-readable storage medium of claim 15, wherein the method further comprises:
    specifying at least one constraint for the determining, wherein said at least one constraint specifies a value for at least one of the phrase characteristics,
    wherein determining, for each one text phrase, whether there is an audio phrase that corresponds to the one text phrase, based at least in part on the phrase characteristics, comprises identifying, from the plurality of stored audio phrases, audio phrases having an associated phrase characteristic value matching the at least one constraint and reviewing the identified audio phrases to determine whether the audio phrases having the associated phrase characteristic correspond to the one text phrase.

17. The at least one non-transitory computer-readable storage medium of claim 12, wherein identifying the phrase coverage comprises identifying at least one first text phrase of the first plurality of text phrases to which none of the plurality of stored audio phrases corresponds.

18. The at least one non-transitory computer-readable storage medium of claim 12, wherein the determining for each one text phrase comprises querying, using the one text phrase, a data store of the phrase characteristics associated with the plurality of stored audio phrases.

19. The at least one non-transitory computer-readable storage medium of claim 16, wherein the determining for each one text phrase comprises querying, using the one text phrase and the at least one constraint, a data store of the phrase characteristics associated with the plurality of stored audio phrases.

20. A system comprising:
    at least one processor; and
    at least one non-transitory storage medium having encoded thereon executable instructions that, when executed by the at least one processor, cause the at least one processor to carry out a method of evaluating a plurality of stored audio phrases and at least one finite state grammar, wherein the at least one finite state grammar defines at least a first plurality of text phrases and wherein the plurality of stored audio phrases correspond to a second plurality of text phrases, the method comprising:
        determining, for each one text phrase of the first plurality of text phrases and based at least in part on phrase characteristics associated with the plurality of stored audio phrases, whether there is an audio phrase of the plurality of stored audio phrases that corresponds to the one text phrase; and
        identifying a phrase coverage for the at least one finite state grammar based at least in part on whether the audio phrase corresponds to the text phrase, the phrase coverage indicating whether there are one or more text phrases of the first plurality of text phrases defined by the at least one finite state grammar to which none of the plurality of stored audio phrases corresponds.

21. The system of claim 20, wherein the method further comprises:
    testing a speech recognition performance of the at least one finite state grammar using at least one stored audio phrase that was determined in the determining to correspond to at least one text phrase of the first plurality of text phrases.

22. The system of claim 20, wherein the method further comprises maximizing a use of the plurality of stored audio phrases by utilizing each audio phrase of the plurality that corresponds to one or more text phrases of at least one finite state grammar when testing speech recognition performance of each of the at least one finite state grammar.

23. The system of claim 20, wherein the determining, based at least in part on phrase characteristics, comprises determining whether an audio phrase correspond to each one text phrase based at least in part on at least two of a gender of a speaker, an age of a speaker, a native language of a speaker, a region of childhood residence of the speaker, at least one environmental characteristic of the audio phrase, at least one audio capture characteristic of the audio phrase, and a signal to noise ratio (SNR) present in the audio phrase, and wherein the method further comprises specifying at least one constraint that limits the determining to a set of stored audio phrases having a value for at least one of the phrase characteristics matching a value defined in a constraint.

24. The system of claim 20, wherein the method further comprises:

triggering the method upon satisfaction of a condition;

wherein the identifying the phrase coverage comprises generating a report having presentation characteristics specified by a user.

25. The system of claim 24, wherein the triggering the method comprises triggering the method responsive to a change in the plurality of stored audio phrases or a change to the at least one finite state grammar.

26. The system of claim 24, wherein the method further comprises generating a structure query language (SQL)-defined report, based upon user configured settings, the report comprising summary statistics relating to the phrase coverage.

27. The system of claim 14, wherein the method further comprises identifying the phrase coverage at least in part by identifying at least one first text phrase of the first plurality of text phrases to which none of the plurality of stored audio phrases corresponds.

28. The system of claim 20, wherein the the determining for each one text phrase comprises querying, using the one text phrase, a data store of the phrase characteristics associated with the plurality of stored audio phrases.

29. The system of claim 23, wherein the the determining for each one text phrase comprises querying, using the one text phrase and the at least one constraint, a data store of the phrase characteristics associated with the plurality of stored audio phrases.

\* \* \* \* \*